Patented July 7, 1931

1,813,760

UNITED STATES PATENT OFFICE

JOHANNES PFLEGER, OF FRANKFORT-ON-THE-MAIN, GERMANY, ASSIGNOR TO DEUTSCHE GOLD & SILBER SCHEIDEANSTALT VORMALS ROESSLER, OF FRANKFORT-ON-THE-MAIN, GERMANY, A CORPORATION

PROCESS FOR THE MANUFACTURE OF CYANOGEN FORMARYLIDES

No Drawing. Application filed February 14, 1929, Serial No. 340,018, and in Germany November 20, 1928.

The invention relates to a process for the manufacture of cyanogen formarylides in which the nitrogen is substituted by radicals, groups or the like and which have the general formula

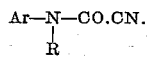

It is known that acid cyanides of the formula R—COCN can be produced by reacting acid chlorides upon HCN in the presence of pyridine when the reaction is carried out in ether solution. It was, however, impossible hitherto to cause this reaction with formic acid chlorides of the formula

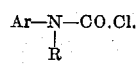

Under the given conditions these chlorides either did not react at all or only to a small extent or they turned into resinous matter so that, in consequence, the yield as regards nitriles was only a very small one.

I have made now the surprising observation that the above mentioned chlorides may be made to react with hydrocyanic acid at ordinary temperature with formation of cyanogen formarylides the nitrogen of which is substituted and, generally, with very good yield if they are brought together in the presence of pyridine but in the absence of diluting agents which do not take part in the reaction. Polymerization of the hydrocyanic acid did not occur to any appreciable extent nor were any other polymerization products formed. In some cases it was beneficial to slightly raise the temperature.

In the formula

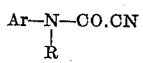

Ar means any substituted or non-substituted aromatic radical, for instance, of the benzene or naphthalene series and R any substituted or non-substituted, aromatic or aliphatic group. The latter group may be linked to the other group forming a ring therewith.

Example I 184 parts N-ethyl-aniline-formic chloride are dissolved in 400 parts of pyridine. 35 parts hydrocyanic acid are added to the solution. The vessel is then sealed hermetically and heated during 8 hours to 50 to 60° centigrade. The pyridine is separated from the reacting product by evaporation in vacuo. The residue is digested in the cold with dilute hydrochloric acid in order to remove small quantities of any pyridine still present and the residue is then dissolved in a solvent, for instance, benzene or ether. After drying the solvent is distilled off. The residue is then distilled in vacuo. 128 parts N-ethyl-cyanogen formanilide of the boiling point 156 to 158° centigrade under 16 mm. pressure (uncorrected) are obtained as a product which crystallizes and fuses not quite sharply at 51° centigrade. Yield 74% of the theory.

Example II 85 parts methyl-analine-formic chloride are mixed with 50 parts by volume of pyridine and 22 parts by volume of hydrocyanic acid and the mixture is heated to 70 to 80° centi-grade for 2 to 3 hours in a pressure vessel. When cold the mass is taken up in ether, the solution washed with dilute hydrochloric acid then with soda, dried and after evaporation of the solvent distilled in vacuo. 60 parts by weight of cyanogen formmethylanilide distill over between 154 and 156° centigrade at 15 mm. pressure. The distilled mass solidifies in crystals. Fusion point 64 to 65° centigrades. Yield 75%.

According to my invention I am able to produce a great number of substances amongst which I enumerate the following which are colourless and furnish well defined crystals.

The following are formulas of such substances prepared in each case from the starting material given, by way of forming the intermediate acid chlorides by the method of Michler (Berichte der Deutschen Chemischen Gesellschaft, Bd. 9, p. 399, und Bd. 12, p. 1165) which may be represented, for example, by the following equation:

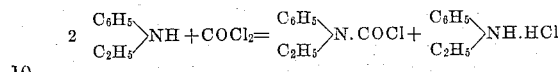

from phenylglycine nitrile:

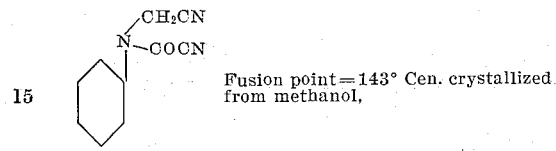

from p-bromo methylaniline:

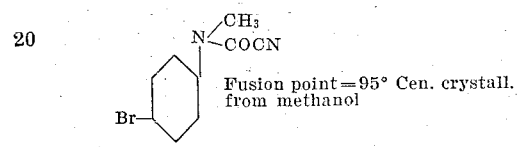

from py-tetrahydroquinoline:

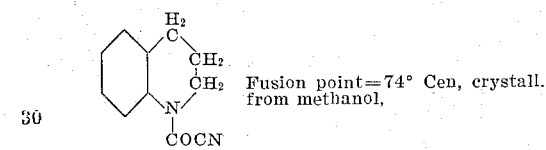

from dihydro-α-methyl-indol:

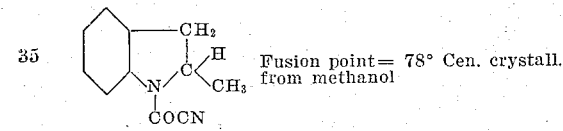

from diphenylamine:

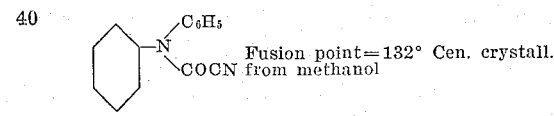

from 8 ethyl-1-naphthylamine

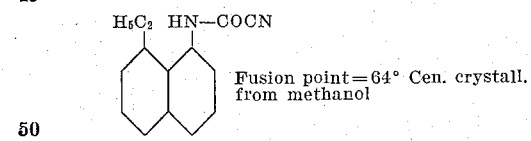

from ethyl-2-naptylamine:

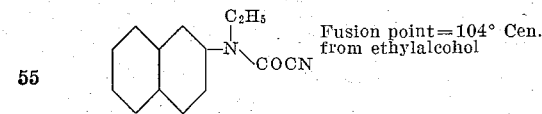

from py-tetrahydro-β-naphthoquinoline:

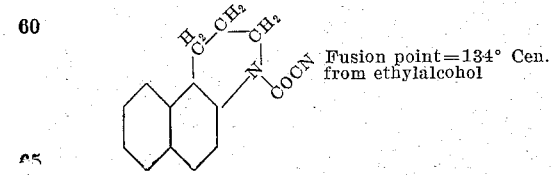

What I claim is:

1. A process for the manufacture of nitrogen substituted cyanogen formarylides of the general formula:

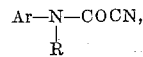

wherein Ar is any substituted or unsubstituted aromatic residue and R is any substituted or substituted aromatic or alphatic residue, which consists in reacting the corresponding acid chlorides of the general formula:

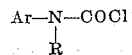

with hydrocyanic acid in pyridine in the absence of any diluting agents other than pyridine.

2. A process for the manufacture of nitrogen substituted cyanogen formarylides of the general formula:

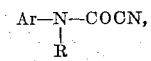

wherein Ar is any substituted or unsubstituted aromatic residue and R is any substituted or unsubstituted aromatic or aliphatic residue, which consists in heating the corresponding acid chlorides of the general formula:

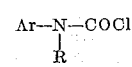

with hydrocyanic acid in pyridine in the absence of any diluting agents other than pyridine.

3. A process for the manufacture of an alkyl nitrogen substituted cyanogen formarylide which comprises reacting the corresponding N-alkyl chlor formarylide with hydrocyanic acid in the presence of pyridine and the absence of any other diluting agents.

Signed at Frankfort-on-the-Main, Germany, this 25th day of January A. D. 1929.

JOHANNES PFLEGER.